United States Patent [19]

Grimberg et al.

[11] Patent Number: 5,989,712
[45] Date of Patent: Nov. 23, 1999

[54] PROCESS FOR TREATING A BODY OF STAINLESS STEEL SO AS TO PROMOTE ITS ADHERENCE TO A RUBBER COMPOSITION

[75] Inventors: Bruno Grimberg; David Lenabour; Patrice Person, all of Clermont-Ferrand; Corinne Tonon, Lyons, all of France

[73] Assignee: Michelin Recherche Et Technique SA, Cours Sablon, France

[21] Appl. No.: 09/085,096

[22] Filed: May 26, 1998

Related U.S. Application Data

[62] Division of application No. 08/620,489, Mar. 22, 1996, Pat. No. 5,789,080.

[30] Foreign Application Priority Data

Mar. 29, 1995 [FR] France .................................. 95/03795

[51] Int. Cl.$^6$ ....................................................... B32B 9/00
[52] U.S. Cl. ...................... 428/391; 156/307.3; 156/910; 427/327; 427/387; 427/409; 427/535; 428/447; 428/450
[58] Field of Search ...................................... 427/327, 387, 427/409, 535; 428/379, 447, 450, 391; 156/302.3, 910

[56] References Cited

U.S. PATENT DOCUMENTS 4,052,524 10/1977 Harakas et al. .......................... 428/383
5,789,080 8/1998 Grimberg et al. ....................... 427/535

*Primary Examiner*—Michael Lusignan
*Attorney, Agent, or Firm*—Baker & Botts LLP

[57] ABSTRACT

Process for treating a body of steel to promote its adherence to a composition which includes at least a rubber, containing the following points:

a body at least the surface of which is of stainless steel is used, this steel containing at least 0.02% and at most 0.2% carbon, at least 3% and at most 20% nickel, at least 12% and at most 28% chromium, the sum of the nickel and the chromium being at least equal to 20% and at most equal to 35%, all of these percentage values being by weight; the structure of the steel includes at least 20% by volume of martensite and is without austenite or it comprises less than 80% thereof by volume;

the surface of the body is activated and then treated with at least one starting silane so that it is covered with a film constituted only, or substantially only, of one or more silanes, in such a manner that this surface treated in this way can be placed directly in contact with the composition.

Articles comprising a rubber composition and a metal body which has been treated in accordance with the process of the invention, such articles being for instance tires.

24 Claims, No Drawings

PROCESS FOR TREATING A BODY OF STAINLESS STEEL SO AS TO PROMOTE ITS ADHERENCE TO A RUBBER COMPOSITION

This is a divisional of allowed application Ser. No. 08/620,489 filed Mar. 22, 1996, now U.S. Pat. No. 5,789, 080.

BACKGROUND OF THE INVENTION

The present invention relates to processes which permit adherence between metal bodies and rubber, these metal bodies being in particular reinforcements used to reinforce rubber articles which may, for instance, be various manufactured articles such as tubes, plies, belts or tires, the metal reinforcements being, for instance, wires, assemblies of wires, or bead rings.

The invention also relates to the articles obtained by these processes.

The invention relates, very particularly, to the case in which the metal bodies are of stainless steel.

It is known to incorporate metal compounds, in particularly cobalt compounds, into rubber compositions in order to favor the adherence of the metal reinforcements to rubber. Such compounds are described, for instance, in French A-2 198 830, and U.S. Pat. No. 2,912,355.

This technique has the following drawbacks:

the metal compounds extensively modify the working properties and the performance of the vulcanized compositions, in particular the resistance to thermal and thermo-oxidizing aging is substantially altered; furthermore, the incorporating of these compounds in the compositions is costly and the metals of these compounds may at times be scarce;

the adherence can, in general, be obtained only on copper, zinc, brass or bronze surfaces, so that it is necessary to effect a coating with these metals or alloys on the metal reinforcement when the latter is of a different constitution, for instance when it consists of steel, which is very commonly used for the reinforcements; such a metal coating is difficult to effect on stainless steel surfaces, since it is then generally necessary to apply a sub-coat, for instance of nickel, before effecting this coating;

the adherence performances of the reinforcements obtained are at times insufficient and one can note, in particular, poor adhesion at high temperatures, degradation over the course of time and/or with respect to corrosion, in particular corrosion in the presence of water.

It is known to use coatings of brass formed by an electrolytic or chemical deposit of copper and zinc, this brass which has diffused well permitting a bonding to compositions which contain low concentrations of cobalt compound or which may even be without such compounds. These coatings have the drawback of being more difficult to produce than the aforesaid coatings and the bonding thus obtained is of poor resistance to thermal aging or thermo-oxidizing aging, for instance in the presence of water.

U.S. Pat. No. 4,441,946 and French A-2 320 974 describe a process for adhering steel to a rubber composition by applying a silane to the surface of the steel before placing it in contact with the composition. Stainless steels are not mentioned in those documents.

SUMMARY OF THE INVENTION

The present invention relates to a process for causing a special stainless steel to adhere in a simple and economical manner to a rubber composition without the steel being coated with a metal material different from steel and without it being necessary for the composition to contain an organometallic compound which favors adherence, the adherence being capable of taking place however even in the presence of such a compound.

The process of the invention for treating a steel body so as to favor its adherence to a composition comprising at least one rubber comprises the following points:

a body is used at least the surface of which is of stainless steel, this steel containing at least 0.02% and at most 0.2% carbon, at least 3% and at most 20% nickel, at least 12% and at most 28% chromium, the sum of the nickel and chromium being at least equal to 20% and at most equal to 35%, all these percentage values being by weight; the structure of the steel comprises at least 20% by volume martensite and is without austenite or it comprises less than 80% thereof by volume;

the surface of the body is activated and then treated with at least one starting silane so that it is covered with a film constituted only, or substantially only, of one or more silanes, in such a way that this surface treated in this manner can be placed directly in contact with the composition.

The starting silane preferably has the formula:

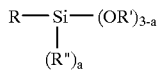

in which R represents an organic radical containing at least one function capable of reacting with at least one element of the composition; each OR' represents a group capable of reacting with an oxide or hydroxide of the surface of the stainless steel; each R" represents, independently, hydrogen, a cyclic or acyclic organic radical, or a halogen; a, which can be zero, is equal to at most 2.

R can, for instance, comprise at least one function capable of reacting with at least one rubber of the composition, or with at least one resin contained in the composition, or with at least one other component contained in the composition.

R is preferably a hydroxyalkyl, an aminoalkyl, a polyaminoalkyl, an epoxyalkyl, in particular a glycidylalkyl, a haloalkyl, a mercaptoalkyl, an alkyl sulfide or an alkyl polysulfide which may contain a silicon atom, an azidoalkyl, or a cyclic or acyclic radical comprising at least one double bond.

Each R' is, for instance, independently, hydrogen or a cyclic or acyclic organic or organometallic radical.

When R' is an organometallic radical, it preferably comprises at least one silicon atom.

Each R' is preferably, independently, hydrogen, an alkyl having from 1 to 6 carbon atoms, an organometallic radical comprising 1 to 6 carbon atoms, and at least one silicon atom.

Each R" is preferably, independently, an alkyl having from 1 to 6 carbon atoms.

a is preferably equal to zero or 1.

Examples of these compounds which can be used are 3-aminopropyl-triethoxysilane, 3-glycidoxypropyl-trimethoxy-silane, 3-mercaptopropyl-trimethoxysilane, N-beta-aminoethyl-3-aminopropyl-trimethoxysilane, 3-aminopropyl-trimethoxy-silane, 3-aminoethyl-triethoxysilane, 3-glycidoxyethyl-triethoxysilane, 3-mercaptopropyl-triethoxysilane, N-beta-aminoethyl-3-aminoethyl-trimethoxysilane, 3-aminobutyl-triethoxysilane, 3-aminoethyl-trimethoxysilane, 3-amino-propyl-methyl-diethoxysilane, bis-triethoxy-silylpropyl tetrasulfide, bis-trimethoxy-silylpropyl tetrasulfide, p-(trimethoxy-silyl) benzyl diazoacetate, 4-(trimethoxysilyl) cyclohexyl-sulfonyl azide, 6-(trimethoxysilyl)hexylsulfonyl azide.

Preferred compounds are 3-aminopropyl-triethoxysilane, N-beta-aminoethyl-3-aminopropyl-trimethoxysilane, 3-glycidoxypropyl-trimethoxysilane, 3-mercaptopropyl-trimethoxysilane, and 3-aminopropyl-methyl diethoxysilane.

3-aminopropyl-triethoxysilane is particularly preferred.

A single silane or a mixture of silanes may be used.

The silane is preferably soluble in water or in a mixture of water and alcohol, such a solution permitting for instance the hydrolysis of the starting silane.

The composition can for instance be the composition to which the body is intended to adhere, in particular in order to reinforce it, or it can form an adhesive intermediate layer arranged directly in contact with the body so as to adhere then to another rubber composition which the body is for instance to reinforce; the composition which serves to form the adhesive intermediate layer may then for instance be present in the form of a solution or a suspension in one or more organic solvents or in the form of an aqueous suspension. The adhesive intermediate layer may also be formed, for instance, by directly extruding the composition onto the surface of the body, in particular with an extruder, the composition then preferably being in a viscous or pasty form, but not in the form of a solution or a suspension. The use of such an adhesive may have the advantage of simplifying the formulating of the composition which it is desired to reinforce.

The invention also concerns articles comprising a rubber composition and a metal body treated in accordance with the process of the invention. These articles are, for instance, tubes, belts, and tires.

The rubber of the composition is preferably an unsaturated rubber, for instance natural rubber or a synthetic rubber. Examples of such synthetic rubbers are polyisoprene, polybutadiene, polychloroprene, butyl rubber, styrene-butadiene copolymers, acrylonitrile-butadiene-styrene copolymers, EPDM (ethylene-propylene-diene) terpolymers. However, the rubber or rubbers of the composition may also be saturated, for instance ethylene-propylene copolymers. These rubbers may be cross-linked for instance under the action of sulfur, peroxides or bismaleimides, with or without sulfur, the cross-linking agents being incorporated in the composition where they can be without cross-linking system, such as for instance thermoplastic rubbers.

The composition may comprise a single rubber or a mixture of at least two rubbers of the same type or different types; for example, it may comprise a mixture of an unsaturated rubber and a saturated rubber.

The composition may furthermore comprise the customary fillers and additives, such as, for instance, carbon black, silica, stearic acid, zinc oxide, vulcanization accelerators, anti-aging agents, in particular antioxidants, oils or agents which facilitate the working, and reinforcing resins, in particular resins of the phenol-formol or resorcinol-formol type.

The metal body is preferably a reinforcement, for instance a wire, a ribbon, an assembly of wires and/or of ribbons, in particular a cable or a bead ring.

The silane is preferably used in the form of a solution, the concentration of the silane in the solution being, for instance, between 0.05% by weight and 10% by weight, and preferably between 0.1% by weight and 5% by weight. In certain cases, a slight acidification of the solvent improves the performance of the organosilane.

It is necessary that the surface of the body be activated before contact with the silane. This activation can be effected in various ways known in the art, for instance by a chemical treatment, preferably an acid treatment, or a physical treatment, preferably a plasma treatment. The surface of the body is preferably activated by an aqueous acid solution, for instance aqueous phosphoric acid. A sulfochromic bath can also be used for this purpose.

After this activation, the surface can, for instance, be rinsed with water and dried in air.

It should be noted that there is concerned here a true activation treatment which modifies the stainless steel surface without it being possible to determine precisely the nature of this change which may take place, for instance, by the formation of non-stoichiometric hydroxides or oxides of nickel and chromium. There is not concerned here a simple cleaning, for instance a washing, intended to remove dirt or impurities from the surface of the stainless steel without modifying it. It is, however, preferred also to wash the surface, particularly in the production of thin wires by wire drawing, either before the activation treatment or during the period of activation, for instance by using a treatment with an acid bath containing a surface-active agent, such a bath permitting these two operations simultaneously. The depositing of the silane on the body can be obtained by any known process, continuous or discontinuous, for instance an application with a brush, by dipping, or by spraying.

After the application of the silane, the surface of the body can for instance be dried in ambient air or by heating in a furnace or a tunnel, the heating being for instance obtained by conduction in contact with hot gas or electrically, in particular, by joule effect or by induction. This heating permits the departure of the solvent or solvents if any, as well as the reaction of at least one silane with the stainless steel surface of the body; it also permits the cross-linking of the silane or silanes and therefore the formation of a silane polymer network to form a film which is without, or practically without, compounds other than silanes.

The body thus treated in accordance with the invention can be placed directly in contact with the rubber composition, without adhesive layer, this composition possibly containing a known reinforcing resin of phenol-formol or resorcinol-formol type in a concentration of, for instance, 0.1 to 20% by weight of the composition, and preferably between 1 and 8 by weight of the composition. For example, if the silane selected contains an amine function, the rubber composition will preferably contain a reinforcing resin of phenol-formol type or a resin of resorcinol-formol type, the formol being possibly replaced by other methylene donors, such as hexamethylene tetramine (HMTA) or hexa (methoxymethyl)melamine (H3M). In the event that the silane reacts with a resin, this reaction preferably takes place upon the vulcanization of the rubber, if the rubber is vulcanizable.

If the silane selected contains a mercapto, polysulfide, azide or alkene function, the composition may then contain a simple cross-linking system (for instance sulfur, a vulcanization accelerator, a peroxide), the silane then reacting directly with the rubber upon the vulcanization.

When the composition is used as adhesive, this adhesive is advantageously used, in known manner, either in the form of a solution or a suspension in one or more organic solvents, or in the form of an aqueous suspension, said solution or suspension then preferably containing a reinforcing resin, or else by direct extrusion of the composition onto the When the adhesive is in the form of a solution or a suspension, the solvent or solvents are preferably alkanes, for instance heptane, or distillation cuts of petroleum, and/or aromatic compounds, for instance toluene.

When the adhesive is in the form of an aqueous suspension, it is obtained preferably, in known manner, by mixing one or more latexes of one or more rubbers with an aqueous solution of one or more resorcinol-formol precondensates, which gives a known adhesive of RFL type formed solely of an aqueous solution of the resin or resins containing the rubber or rubbers in suspension.

The dry extract of the solution or suspension generally comprises between 5% and 30% and preferably between 10 and 15% by weight.

The adhesives can, for instance, be applied to the body by the same techniques as those mentioned previously for the application of the silane.

The adhesives described above can be dried, for instance, by means of a furnace or tunnel at a temperature of preferably between 100° C. and 250° C. for a period of time of, for instance, between 10 seconds and 10 minutes.

When the composition is used as adhesive to favor the bonding between the body and another composition, for instance a composition to be reinforced by the body, this other rubber composition may be a known composition without any special, preferential limitation with respect to its various components and such limitations are not indicated for reasons of simplification.

In all the cases cited above, the reinforcing resins may, if applicable, be obtained in situ upon the curing of the composition, the latter then containing, before the curing, the basic components of said resin, for instance resorcinol and a hardener such as HMTA.

The adherence between the metal and the rubber composition is obtained at the end of the curing of this composition, which is preferably effected under pressure. Furthermore, the reactions mentioned above of the silanes with the stainless steel as well as said cross linkings of the silanes may possibly take place at least partially upon this curing.

DESCRIPTION OF PREFERRED EMBODIMENTS

Definitions and Tests

1. Dynamometric Measurements.

The measurements of resistance to rupture, rupture force and elongation upon rupture of the steel wires are carried out in traction in accordance with AFNOR method NF A 03-151 of June 1978.

2. Torsional Ductility

By definition, the torsional ductility of a wire is the number of turns of twisting on itself that the wire can withstand. This measurement is effected on a length of wire equal to 500 times its diameter. One end of this wire is held in a fixed jaw and the other end is held in a rotary jaw which is rotated in such a manner that the axis of rotation is the same as the axis of the wire, the tension upon this twisting being equal to 5% of the rupture force in tension of the wire measured before twisting, and the number of turns necessary in order to cause the rupture of the wire are counted.

3. Structure of the Steels.

The identification and quantification of the structure of the steels are effected in the following manner:

An X-ray diffraction method is employed. The method used consists of determining the total diffracted intensity for each of the phases of the steel, in particular the α' martensite, the ∈ martensite, and the gamma austenite, totalling the integrated intensity of all the diffraction peaks of this phase, which makes it possible to calculate the percentages of each of the phases with respect to the total of all of the phases of the steel.

The X-ray diffraction spectra are determined on the section of wire to be studied with a goniometer, using a chromium anticathode.

Sweeping makes it possible to obtain the characteristic lines of each of the phases present. In the case of the three phases mentioned above (the two martensites and the austenite), the sweep is 50 degrees to 160 degrees.

In order to determine the integrated intensities of the peaks, it is necessary to deconvolute the interfering rays.

The following relationship applies for each peak of any phase:

$I_{int} = (L_{mh} \times I_{max})/P$ in which:

$I_{int}$ = the integrated intensity of the peak
$L_{mh}$ = the width at mid-height of the peak (in degrees)
$I_{max}$ = the intensity of the peak (in counts per second)
P = the measurement pitch of the peak (0.05 degrees).

One has, for example, the following characteristic lines:

| | | | |
|---|---|---|---|
| Gamma austenite | line (111) | 2θ = | 66.8 |
| | line (200) | 2θ = | 79.0 |
| | line (220) | 2θ = | 128.7 |
| α' martensite | line (110) | 2θ = | 68.8 |
| | line (200) | 2θ = | 106 |
| | line (211) | 2θ = | 156.1 |
| ∈ martensite | line (100) | 2θ = | 65.4 |
| | line (002) | 2θ = | 71.1 |
| | line (101) | 2θ = | 76.9 |
| | line (102) | 2θ = | 105.3 |
| | line (110) | 2θ = | 136.2 |

The angle 2θ is the total angle in degrees between the incident beam and the diffracted beam.

The crystallographic structures of the preceding phases are as follows:

Gamma austenite: face centered cubic α' martensite: body centered cubic or body centered tetragonal ★ martensite: hexagonal.

One can then calculate the percentage by volume of any phase "i" by the following relationship:

% of phase "i" = $I_i/I_t$ in which:
$I_i$ = sum of the integrated intensities of all the peaks of said phase "i"
$I_t$ = sum of the integrated intensities of all the peaks of all the diffraction phases of the steel.

One therefore has, in particular:
% of α' martensite = $I_{\alpha'}/I_t$
% of ∈ martensite = $I_\in/I_t$
total % of martensite = $(I_{\alpha'} + I_\in)/I_t$
% of gamma austenite = $I_{gamma}/I_t$
with:
$I_{\alpha'}$ = integrated intensity of all the peaks of α' martensite
$I_\in$ = integrated intensity of all the peaks of ∈ martensite
$I_{gamma}$ = integrated intensity of all the peaks of gamma austenite.

In the following, the different percentages concerning the phases of the structure of the steel are expressed in volume and the terms "martensite" or "martensite phase" cover all of the α' martensite and ∈ martensite phases, the term % martensite therefore representing the % by volume of the total of these two martensitic phases and the term "austanite" represents gamma austenite.

The percentages by volume of the different phases, determined by the preceding method, are obtained with a precision of about 5%.

4. Bonding Measurements

The bonding measurements are carried out on metal reinforcements which are either isolated wires or assemblies of wires.

The quality of the bond between a metal reinforcement and a rubber composition is assessed by a test in which one measures the force necessary to extract the reinforcements from the vulcanized composition, also known as vulcanizate. The vulcanizate is a block of rubber formed of two plates of a size of 300 mm×150 mm and a thickness of 3.5 mm, applied one to the other before curing (the thickness of the resultant block is therefore 7 mm). Upon the making of this block, the reinforcements, twelve in number, are interposed between the two raw plates and only a reinforcement length of 1 cm is then left free to come in contact with the composition to which this reinforcement length will be bonded during the curing. The rest of the length of the reinforcement is covered by a thin film of aluminum in order to prevent any adherence beyond the 1 cm zone. The block containing the reinforcements is then placed in a suitable mold and cured under a pressure of 11 bars.

The temperature and the curing time of the block are a function of the desired test conditions, as indicated below.

Simple Curing

The block is heated to a temperature of 140° C. or 150° C. for a period of time which may range from 30 minutes to 2 hours, under a pressure of 11 bars.

Overcuring (thermal stability)

The overcuring, effected instead of the simple curing, is a treatment which makes it possible to determine the resistance of the samples to heat alone. The block is heated at 140° C. for 6 hours under a pressure of 11 bars.

Thermal Aging in Humid Phase

This treatment makes it possible to determine the resistance of the samples to the combined action of heat and water.

After the simple curing, the samples are placed in an atmosphere of saturated steam at 110° C. for 16 hours.

At the end of the simple curing or of the overcuring, or the thermal aging in humid phase, the block is cut into test specimens serving as samples, each containing a reinforcement, which is placed under traction by means of a traction machine. The traction rate is 50 mm/min.

The adherence is thus characterized by the force necessary to pull the reinforcement from the test specimen (pulling force) at 20° C. (average of 12 measurements corresponding to 12 reinforcements).

II. EXAMPLES

The invention will be easily understood by means of the following non-limitative examples.

In all these tests, all the data concerning the formulations of the rubber or resin compositions are parts by weight, unless otherwise indicated.

IIA. Examples on Isolated Wires

In all these cases, identical wires of stainless steel are used having the following composition:

C: 0.08; Cr: 18.3; Ni: 8.75; Mo: 0.3; Mn: 0.8; Si: 0.75; Cu: 0.3; N: 0.04; S: 0.001; P: 0.019; the balance being formed of iron with the inevitable customary impurities. All these figures concerning the composition of the steel are in per cent by weight. The structure of this steel comprises more than 50% by volume martensite and less than 50% by volume austenite.

These wires have the following properties: diameter: 1.3 mm; resistance to rupture 2250 MPa; elongation upon rupture: 1%.

These wires are prepared by work hardening of a machine wire of stainless steel of austenitic structure, this machine wire having a diameter of 5.5 mm.

These wires are used as is (each of them is therefore referred to subsequently as "bare wire") or with a coating of brass applied over a coating of nickel in the control tests not in accordance with the invention (each of them is then referred to subsequently as "brass-coated wire"). The brass used is a brass made by the electrolytic co-deposition of copper and zinc containing 69% copper, which brass can be used to bond compositions without cobalt compounds. The thickness of the coating is equivalent to 52 mg of brass for 100 g of wire.

The three known compositions of rubber which is follow are used in these examples.

Composition 1

This composition, which contains a reinforcing resin, has the following formulation:

| | |
|---|---|
| Natural rubber | 100 |
| Black N326 | 75 |
| Zinc oxide | 6 |
| Stearic acid | 1 |
| Antioxidant | 1 |
| Phenol-formol resin | 4 |
| Sulfur | 6 |
| Sulfenamide | 1 |
| Hardener | 1.6 |

Composition 2

This composition, which is without reinforcing resin, has the following formulation:

| | |
|---|---|
| Natural rubber | 100 |
| Black N326 | 45 |
| Zinc oxide | 8 |
| Stearic acid | 0.5 |
| Antioxidant | 1 |
| Sulfur | 6 |
| Sulfenamide | 1 |

Composition 3

This composition contains a reinforcing resin and a natural rubber/SBR blend. It has the following composition:

| | |
|---|---|
| Natural rubber | 50 |
| SBR | 50 |
| Black N326 | 60 |
| Zinc oxide | 8 |
| Stearic acid | 0.5 |
| Antioxidant | 1 |
| Phenol-formol resin | 8 |
| Hardener | 3 |
| Sulfur | 7 |
| Sulfenamide | 1 |

In the three above compositions, the following definitions apply:

SBR: Styrene-butadiene copolymer prepared in solution with an alkyl-lithium catalysis, this copolymer comprising 26% styrene and 74% butadiene, the butadiene phase comprising 24% 1–2 vinyl bonds. The glass transition temperature (Tg) of the copolymer is −48° C. and its Mooney viscosity (100° C.) is 54.

Black N326: Designation in accordance with ASTM Standard D-1765.

Antioxidant: N-(1,3-dimethylbutyl)-N'-phenyl-p-phenylenediamine.

Sulfenamide: N-dicyclohexyl-2-benzothiazole sulfenamide.

Phenol-formol resins: Precondensate of Type SFP 118 (Schenectady company)

Hardener: Hexamethylene tetramine (HMTA).

The three compositions are without adherence promoter of cobalt-salt type.

Example 1 (not in accordance with the invention)

A bare wire is treated at 50° C. for 30 seconds with an aqueous phosphoric acid solution of a pH of 1 (concentration by weight, of phosphoric acid about 2.5%) containing a surface-active agent (Ultraspeed 4353 solution of the Condat company, Chasse sur Rhone, France, diluted to 10% by volume), then rinsed with water and dried in ambient air.

The adhesion test is then carried out between the bare wire treated in this manner and composition 1, after simple curing effected for 60 minutes at 150° C. A pulling force of 5 daN is obtained.

This test shows that the adherence is poor.

Example 2 (not in accordance with the invention)

The adherence test is carried out between a brass-plated wire and composition 1 after simple curing for 60 minutes at 150° C. A pulling force of 96 daN is obtained.

This test shows that the adherence is better than in the preceding example, due to the presence of the brass.

Example 3 (not in accordance with the invention)

The adherence test is carried out between a brass-plated wire and composition 1 after overcuring for 6 hours at 140° C. The pulling force is 70 daN.

This test shows that the overcuring causes a substantial decrease in the adherence, this decrease being about 27%.

Example 4 (not in accordance with the invention)

The adherence test is carried out between a brass-plated wire and composition 1 after curing for 60 minutes at 150° C. followed by thermal aging in humid phase.

The pulling force determined in this manner is 7 daN.

This test shows that the adherence suffers a considerable decrease after the treatment by thermal aging in humid phase, this decrease being about 93%

Example 5 (in accordance with the invention)

A bare wire is treated in the same manner as in Example 1, except that after the air drying, it is immersed in a 90/10 (by volume) ethanol/water solution of 3-aminopropyl-triethoxysilane (concentration of about 1% by weight) and dried for 1 minute at 160° C. The adherence test is then carried out between the wire which has been treated in this way and composition 1 after simple curing for 60 minutes at 150° C.

The pulling force obtained is 72 daN, which is to say it is acceptable. The acid treatment solution permits both the cleaning of the metal surface and its activation before the treatment with silane. After the treatment with silane, the metal surface is covered by a film formed entirely or practically entirely, by cross-linked silane.

Example 6 (in accordance with the invention)

The adherence test is carried out between a bare wire treated as in Example 5 and the composition 1 after overcuring for 6 hours at 140° C.

The pulling force obtained s 69 daN, that is to say there is practically no decrease as compared with Example 5.

Example 7 (in accordance with the invention)

The adherence test is carried out between a bare wire treated in accordance with Example 5 and the composition 1 after simple curing for 60 minutes at 150° C. and thermal aging in humid phase.

The pulling force obtained is 65 daN.

It is noted that the decrease in this force as compared with Example 5 is very slight, since it is about 10%.

Example 8 (not in accordance with the invention)

The adherence test is carried out between a brass-coated wire and composition 2, after simple curing for 90 minutes at 140° C. A pulling force of 90 daN is obtained.

Example 9 (not in accordance with the invention)

The adherence test is carried out between a brass-coated wire and composition 2 after overcuring for 6 hours at 140° C. Practically the same pulling force is obtained as in Example 8, probably as a result of the absence of resin in composition 2.

Example 10 (not in accordance with the invention)

The adherence test is carried out between a brass-coated wire and composition 2 after simple curing for 90 minutes at 140° C. and then after thermal aging in humid phase. A pulling force of 25 daN is obtained. The decrease as compared with Example 8 is therefore about 72%, in other words very substantial.

Example 11 (in accordance with the invention)

A bare wire is treated as in Example 5, with the difference that an aqueous solution of silane is used.

An adhesive of type RFL is then deposited by dipping on the wire treated in this manner.

The synthesis of the adhesive is effected in two steps.

First Step

In this step, a resin solution having the following formula is formed:

| | |
|---|---|
| $H_2O$ | 100 |
| Formaldehyde, 31% in water | 14.7 |
| Resorcinol | 8.1 |
| Solution of 1 Mol/1 NaOH | 5.9 |

The precondensation of the resin is effected for 4 hours at room temperature.

Second Step

In this second step, an aqueous suspension is produced from the preceding precondensate and a latex, the composition of the suspension being as follows:

| H$_2$O | 100 |
|---|---|
| Latex, 40% in water | 34.6 |
| Precondensate | 23.5 |
| Solution of NH$_4$OH d = 0.92 | 4.1 |

The rubber of the latex is a vinylpyridine-styrene-butadiene terpolymer containing 15% vinylpyridine units. Its surface tension is 47.5 mJ/m$^2$ and its Mooney viscosity at 100° C. is 37.

The characteristics of the adhesive prepared in this manner are:

Mass percentage of dry extract of the resin=10%;

Resin-mass/dry-extract mass of the latex=0.17;

Number of moles of formol/number of moles of resorcinol=2;

Number of moles of NaOH/number of moles of resorcinol=7.5×10$^{-2}$.

Upon this second step, the postcondensation is carried out for 16 hours at room temperature.

The adhesive applied onto the wire is dried for 3 minutes at 150° C. The adherence test between the wire which has been treated in this manner and composition 2 is then effected after simple curing for 90 minutes at 140° C. The pulling force thus obtained is 86 daN, which is substantially the same as Example 8.

Example 12 (in accordance with the invention)

A bare wire is treated as in Example 11. The adherence test is then carried out between the wire treated in this manner and composition 2, after overcuring for 6 hours at 140° C. There is thus obtained a pulling force of 79 daN, which represents a decrease of about 8 as compared with Example 11, which is very slight.

Example 13 (in accordance with the invention)

The adherence test is carried out between the wire treated in accordance with Example 11 and composition 2 after a simple curing effected for 90 minutes at 140° C. and after thermal aging in humid phase. There is thus obtained a pulling force of 36 daN, which represents a decrease of about 58% as compared with Example 11, namely a much smaller decrease than in Example 10.

IIB. Examples with Reinforcement Assemblies

In the examples which follow, assemblies of wires were used as reinforcement and their adherence in contact with a rubber composition was measured.

The assemblies are formed of stainless steel wires having the following composition:

C: 0.096; Cr: 17.6; Ni: 7.7; Mo: 0.7; Mn: 1.3; Si: 2.0; Cu: 0.2; N: 0.04; S: 0.001; P: 0.019; the balance being formed of iron with the inevitable customary impurities. All of these figures concerning the composition of the steel are % by weight.

The wires which constitute the assemblies are in accordance with European Patent Application No. 94115799.2 and French Patent Application No. 9412372, which applications are incorporated by reference in the present application. These wires have the following properties:

For Examples 14 to 25:

diameter: 0.224 mm; resistance to rupture: 2805 MPa; rupture force: 110 N; elongation upon rupture: 1%; torsional ductility: 60 turns; structure: martensitic phase practically equal to 85% by volume, this phase consisting practically exclusively of α' martensite, the austenite phase being practically 15% by volume.

For Examples 26 to 28:

diameter: 0.18 mm; resistance to rupture: 2500 MPa; rupture force: 63.6 N; elongation upon rupture: 1%; torsional ductility: 70 turns; structure: martensitic phase practically equal to 57% by volume, this phase consisting practically exclusively of α' martensite, the austenite phase being practically 43% by volume.

These wires are used in the assemblies either as is (each of them is then referred to subsequently as "bare wire") or with a coating of brass in the control tests not in accordance with the invention (each of them being then referred to subsequently as "brass-coated" wire). The brass used is a thermal brass containing 64% copper. This brass is produced by thermal diffusion after depositing of a layer of copper followed by a deposit of a layer of zinc. This brass is intended to be used to bond rubber compositions containing cobalt compounds. The thickness of the brass coating is equivalent to 0.19 μm on the fine wire, after wire drawing, the brass-coating being effected on a thin layer of nickel previously deposited directly in contact with the stainless steel, before wire drawing.

In examples 14 to 25 which follow, assemblies which are all of the same type, designated 6×23NF, are used.

Each of these assemblies, without hoop, is formed in three strands, each strand being formed of two wires twisted together with a pitch of 12.5 mm, the twist of the wires of one strand being effected in direction opposite that of the wires of the other two strands, all of these strands being twisted together with an assembly pitch of 12.5 mm, the direction of winding of the assembly being the same as the direction of winding of the wires in the two strands the wires of which are wound in the same direction.

In Examples 26 to 28, assemblies of type 19.18, not hooped, are used, each assembly being an assembly of layers the characteristics of which are as follows:

an untwisted core wire;

an intermediate layer of six wires wound around the core, with a pitch of 10 mm;

an outer layer of twelve wires wound around the intermediate layer in the same direction as said intermediate layer, with a pitch of 10 mm.

In Examples 14 to 25 which follow, the compositions 1, 2 or 3 described above are used, with the difference that in the case of the assemblies with brass-coated wires, these compositions comprise furthermore one part by weight of cobalt naphthenate to 100 parts by weight of elastomer (composition 1 or 2) or elastomer blend (composition 3).

Example 14 (not in accordance with the invention)

The adherence test is carried out between an assembly formed of brass-coated wires and composition 1, after simple curing for 60 minutes at 150° C. A pulling forc e of about 48 daN is thus determined.

Example 15 (not in accordance with the invention)

The adherence test is carried out between an assembly formed of brass-coated wires and composition 1, after overcuring for 6 hours at 140° C. A pulling force of 39 daN is then determined. The decrease as compared with example 14 is about 19%.

Example 16 (not in accordance with the invention)

The adherence test is carried out between an assembly formed of brass-coated wires and composition 1, after simple curing for 60 minutes at 150° C. followed by thermal aging in humid phase.

The pulling force is 28 daN.

This test shows that the adherence experiences a considerable decrease after the thermal aging treatment in humid phase, this decrease being about 42%.

Example 17 (in accordance with the invention)

An assembly of bare wires is treated as in Example 5. Thereupon, an adhesive of solution type having the following formula is deposited by dipping on the assembly of wires treated in this manner:

| Natural rubber | 100 |
| Black N326 | 47 |
| Silica | 8 |
| Zinc oxide | 5 |
| Stearic acid | 2 |
| Antioxidant | 1 |
| Resorcinol-formol resin | 5 |
| Sulfur | 3 |
| Sulfenamide | 1 |
| Hardener | 5 |

Antioxidant, sulfenamide and hardener: Same characteristics as for compositions 1, 2, and 3.

Silica of Ultrasil VN3 type (Degussa company)

Resorcinol-formol resin: Precondensate of type SRF 1500 (Schenectady company).

The composition is dissolved in heptane, the concentration of solids being equal to 10% by weight.

The adhesive is dried for 3 minutes at 160° C.

The adherence test is then carried out between the assemblies of wires treated in this manner and composition 2 after simple curing for 90 minutes at 140° C.

A pulling force equal to 42 daN is then obtained.

Example 18 (in accordance with the invention)

An assembly of bare wires is treated in the same manner as in Example 17. The adherence test is then carried out between the assemblies treated in this manner and composition 2 after simple curing for 90 minutes at 140° C., followed by thermal aging in humid phase.

The pulling force thus determined is 46 daN. There is therefore no decrease as compared with Example 17.

Example 19 (in accordance with the invention)

An assembly of bare wires is activated by the same phosphoric acid solution as in Example 1, at 50° C. for 30 seconds, whereupon it is rinsed with water and dried in ambient air. It is then dipped in an aqueous solution of 3-glycidoxypropyl-trimethoxysilane of a pH of 4 (concentration 1% by weight, acidification with acetic acid) and dried for 1 minute at 160° C.

The same adhesive as in Example 17 is then deposited on the assembly of wires treated in this manner.

The adherence test is then carried out between the assembly of wires treated in this manner and composition 2 after simple curing for 90 minutes at 140° C.

The pulling force obtained is 35 daN.

Example 20 (in accordance with the invention)

The adherence test is carried out between an assembly of bare wires treated as in Example 19 and composition 2 after overcuring for 6 hours at 140° C. The pulling force obtained is 35 daN, that is to say there is no decrease as compared with Example 19.

Example 21 (in accordance with the invention)

An assembly of bare wires is activated by the same phosphoric acid solution as in Example 1, at 50° C. for 30 seconds, whereupon it is rinsed with water and dried in ambient air. It is then dipped into an aqueous solution of 3-mercaptopropyl-trimethoxysilane of a pH of 3 (concentration of 1% by weight, acidification with acetic acid) and dried for 1 minute at 160° C.

The adherence test is then carried out between the assembly of wires treated in this manner and composition 1 after simple curing for 60 minutes at 150° C.

The pulling force obtained is 25 daN.

Example 22 (in accordance with the invention)

The adherence test is carried out between an assembly of bare wires treated as in Example 21 and composition 1 after overcuring for 6 hours at 140° C. The pulling force thus obtained is 35 daN, that is to say it is better than after simple curing (Example 21).

Example 23 (in accordance with the invention)

An assembly of bare wires is activated by the same phosphoric acid solution as in Example 1, at 50° C. for 30 seconds, whereupon it is rinsed with water and dried in ambient air. It is then dipped into a 90/10 (by volume) ethanol/water solution of 3-aminopropyl-methyl-diethoxysilane (concentration of 1% by weight) and dried for 1 minute at 160° C.

The same adhesive as in Example 17 is then deposited on the assembly of wires treated in this manner.

The adherence test is then carried out between the assembly of wires treated in this manner and composition 2 after simple curing for 90 minutes at 140° C.

The pulling force obtained is 40 daN.

Example 24 (in accordance with the invention)

An assembly of bare wires is treated as in Example 5.

The adherence test is then carried out between the assembly treated in this manner and composition 3, after a simple curing of 60 minutes at 140° C.

The pulling force obtained is 32 daN.

Example 25 (in accordance with the invention)

The adherence test is carried out between an assembly of bare wires treated as in Example 24 and composition 3 after overcuring for 6 hours at 140° C.

The pulling force obtained is 30 daN, that is to say there is practically no decrease as compared with Example 24.

Example 26 (in accordance with the invention)

An assembly 19.18 (bare wires) is treated as in Example 17, except that the treatment with the phosphoric acid solution is effected for 15 seconds at 70° C. The adherence test is then carried out between this assembly treated in this manner and composition 4, the formula of which is as follows:

| | |
|---|---|
| Natural rubber | 100 |
| Black N326 | 60 |
| Zinc oxide | 9 |
| Antioxidant | 1 |
| Stearic acid | 0.5 |
| Sulfur | 9 |
| Sulfenamide | 1 |

In this formula, the definition of black, antioxidant and sulfenamide are the same as those given for formulas 1 to 3.

The adherence test is carried out after simple curing for 1 hour at 140° C. The pulling force obtained is 50 daN, that is to say it is good.

On the other hand, the assembly is treated in the manner described above in this example, with the difference that before the silanization, after the treatment with the acid solution, there is also effected a treatment of the surface with an oxygen plasma and thereupon the adherence test is carried out with formula 4, after simple curing for 1 hour at 140° C. The pulling force obtained is 53 daN, that is to say it is slightly greater than the preceding one, but the difference is not substantial. This shows that the treatment with the acid solution described in Example 5 permits both a good cleaning of the metal surface and a good activating of said surface, further activation (for instance by plasma, as described in this example) not being necessary before the silane treatment.

Example 27 (in accordance with the invention)

An assembly 19.18 is treated in the same manner as in Example 26, with and without plasma treatment, with the difference that there is used an aqueous solution of potash and sodium carbonate (concentration in KOH: 2 moles/liter; concentration in $Na_2CO_3$: 0.5 moles/liter) instead of the solution of Example 5, and that the treatment is carried out for one minute at about 50° C., under the joint action of ultrasonics. The simple curing tests carried out as in Example 26 give the following values:

without plasma treatment: 38 daN;

with plasma treatment: 53 daN.

It is therefore seen that the potash solution does not permit satisfactory activation of the surface before the silane treatment, but that this solution permits a satisfactory cleaning of the surface so that the plasma treatment permits a good activating of the surface before the silanization and makes it possible to obtain a satisfactory pulling force.

Example 28 (not in accordance with the invention)

An assembly 19.18 is treated in the same manner as in Example 26, with and without plasma treatment, with the difference that ethanol is used instead of the solution of Example 5, and that the treatment is carried out for 5 minutes at about 50° C., under the joint action of ultrasonics. The simple curing tests carried out as in Example 26 give the following values:

without plasma treatment: 32 daN;

with plasma treatment: 32 daN.

It is therefore noted that these two values are the same, and that they are low. The ethanol, therefore, does not make it possible to obtain an activation of the surface before the silane treatment, nor does it make it possible to effectively clean the surface so that the plasma activation treatment is ineffective.

The invention has the following advantages:

One avoids the use of organometallic compounds in the rubber compositions, the performance of which thus remains stable; furthermore, the incorporation costs and the scarcity risks are reduced;

It is possible to use the non-oxidizable surface of the object directly, without it being necessary to effect a metal coating, for instance a brass coating;

The adherence of the stainless steel bodies, treated in accordance with the invention, to the rubber compositions remains generally high, even after overcuring or after thermal aging in humid phase, while the brass coatings, which can be used with or without cobalt compounds, frequently show a large deficit after overcuring, and particularly after thermal aging in humid phase.

As shown in the examples, it is preferable to clean the metal surface before effecting the activation treatment, or during said treatment, this cleaning being particularly advisable when the diameter of the wire is small, for example on the order of 0.18 mm, since the numerous deformations, in particular the numerous wire drawings, necessary in order to obtain this small diameter, favor the appearance of dirt on the surface. The examples have shown the use of aqueous acid or alkaline solutions in order to effect this cleaning, but other known methods are possible.

The activation treatment described in the examples in accordance with the invention employed an aqueous acid solution or a plasma, but other known techniques are possible.

Of course, the invention is not limited to the embodiments indicated.

We claim:

1. A process for making a body, at least the surface of which comprises stainless steel, that adheres to a composition comprising at least one rubber, said process comprising:

activating the stainless steel surface of the body, said steel containing at least 0.02% and at most 0.2% carbon, at least 3% and at most 20% nickel, at least 12% and at most 28% chromium, the sum of the nickel and chromium being at least equal to 20% and at most equal to 35%, all of these percentages being by weight; the structure of the steel comprises at least 20% by volume of martensite and it is without austenite or contains less than 80% thereof by volume;

treating the surface of the body with at least one starting silane such that the surface is covered with a film constituted exclusively, or substantially exclusively, of one or more silanes characterized by the following formula:

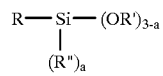

in which R represents an organic radical containing at least one function capable of reacting with at least one element of the composition; each OR' represents a group capable of reacting with an oxide or hydroxide of the surface of the stainless steel; each R" represents, independently, hydrogen, a cyclic or acyclic organic radical, or a halogen; and a, which may be zero, is equal to at most 2;

placing the treated surface of the body in direct contact with the composition; and curing the composition.

2. A process according to claim 1, wherein R comprises at least one function capable of reacting with at least one rubber of the composition, or with at least one resin contained in the composition, or with at least one other component contained in the composition.

3. A process according to claim 1, wherein R is selected from the group consisting of a hydroxyalkyl, an aminoalkyl, a polyaminoalkyl, or an epoxyalkyl.

4. A process according to claim 1, wherein R is a glycidylalkyl, a haloalkyl, a mercaptoalkyl, an alkyl sulfide or an alkyl polysulfide which may contain a silicon atom, an azidoalkyl, or a cyclic or acyclic radical comprising at least one double bond.

5. A process according to claim 1, wherein each R' is, independently, hydrogen or a cyclic or acyclic organic or organometallic radical.

6. A process according to claim 1, characterized by the fact that when R' is an organometallic radical, it comprises at least one silicon atom.

7. A process according to claim 1, wherein each R' is, independently, hydrogen, an alkyl having from 1 to 6 carbon atoms, and an organometallic radical comprising 1 to 6 carbon atoms and at least one silicon atom.

8. A process according to claim 1, wherein each R'' is, independently, an alkyl having from 1 to 6 carbon atoms.

9. A process according to claim 1, wherein a is equal to zero or 1.

10. A process according to claim 1, wherein the silane is selected from the group consisting of 3-aminopropyl-triethoxysilane, 3-glycidoxypropyl-trimethoxysilane, 3-mercaptopropyltrimethoxysilane, N-beta-aminoethyl-3-aminopropyl-trimethoxysilane, 3-aminopropyl-trimethoxy-silane, 3-aminoethyl-triethoxysilane, 3 glycidoxyethyl-thriethoxysilane, 3-mercaptopropyl-triethoxysilane, N-beta-aminoethyl-3-aminoethyl-trimethoxysilane, 3-aminobutyl-triethoxysilane, 3-aminoethyl-trimethoxy-silane, 3-aminopropyl-methyl-diethoxysilane, bis-triethoxy-silylpropyl tetrasulfide, bis-trimethoxy-silylpropyl tetrasulfide, p-(trimethoxysilyl)benzyl diazoacetate, 4-(trimethoxysilyl)cyclohexylsulfonyl azide, and 6-(trimethoxysilyl)hexylsulfonyl azide.

11. A process according to claim 10, wherein the silane is selected from the group consisting of 3-aminopropyl-triethoxysilane, N-beta-aminoethyl-3-aminopropyl-trimethoxysilane, 3-glycidoxypropyl-trimethoxysilane, 3-mercaptopropyl-trimethoxysilane, and 3-aminopropyl-methyl diethoxysilane.

12. A process according to claim 11, wherein the silane is 3-aminopropyl-triethoxysilane.

13. A process according to claim 1, wherein the activation step comprises treating the surface with an aqueous acid solution.

14. A process according to claim 1, wherein the activation step is effected at least in part with a plasma.

15. A process according to claim 1, wherein the surface is cleaned before or during the activation step.

16. A process according to claim 1, wherein the body of steel is a steel wire.

17. A process according to claim 1, wherein the body of steel is an assembly of steel wires.

18. A rubber/steel body composite comprising a rubber composition and a steel body, at least the surface of which comprises stainless steel, that adheres to a composition comprising at least one rubber, said composite being obtainable by a process comprising:

activating the stainless steel surface of the body, said steel containing at least 0.02% and at most 0.2% carbon, at least 3% and at most 20% nickel, at least 12% and at most 28% chromium, the sum of the nickel and chromium being at least equal to 20% and at most equal to 35%, all of these percentages being by weight; the structure of the steel comprises at least 20% by volume of martensite and it is without austenite or contains less than 80% thereof by volume;

treating the surface of the body with at least one starting silane such that the surface is covered with a film constituted exclusively, or substantially exclusively, of one or more silanes characterized by the following formula:

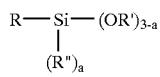

in which R represents an organic radical containing at least one function capable of reacting with at least one element of the composition; each OR' represents a group capable of reacting with an oxide or hydroxide of the surface of the stainless steel; each R'' represents, independently, hydrogen, a cyclic or acyclic organic radical, or a halogen; and a, which may be zero, is equal to at most 2;

placing the treated surface of the body in direct contact with the composition; and curing the composition.

19. A composite according to claim 18 wherein the silane is selected from the group consisting of 3-aminopropyl-triethoxysilane, 3-glycidoxypropyl-trimethoxysilane, 3-mercaptopropyltrimethoxysilane, N-beta-aminoethyl-3-aminopropyl-trimethoxysilane, 3-aminopropyl-trimethoxy-silane, 3-aminoethyl-triethoxysilane, 3 glycidoxyethyl-thriethoxysilane, 3-mercaptopropyl-triethoxysilane, N-beta-aminoethyl-3-aminoethyl-trimethoxysilane, 3-aminobutyl-triethoxysilane, 3-aminoethyl-trimethoxy-silane, 3-aminopropyl-methyl-diethoxysilane, bis-triethoxy-silylpropyl tetrasulfide, bis-trimethoxy-silyipropyl tetrasulfide, p-(trimethoxysilyl)benzyl diazoacetate, 4-(trimethoxysilyl)cyclohexylsulfonyl azide, and 6-(trimethoxysilyl)hexylsulfonyl azide.

20. A composite according to claim 18, wherein the activation step comprises treating the surface with an aqueous acid solution.

21. A composite according to claim 18, wherein the activation step is effected at least in part with a plasma.

22. A composite according to claim 18, wherein the surface is cleaned before or during the activation step.

23. A composite according to claim 18, wherein the body of steel is a steel wire.

24. A composite according to claim 18, wherein the body of steel is an assembly of steel wires.

* * * * *

UNITED STATES PATENT AND TRADEMARK OFFICE
CERTIFICATE OF CORRECTION

PATENT NO. : 5,989,712

DATED : November 23, 1999

INVENTOR(S) : Grimberg et al.

It is certified that error appears in the above-identified patent and that said Letters Patent is hereby corrected as shown below:

title page of patent, Item 73, "Michelin Recherche Et Technique SA (Cours Sablon, FR)" should read --Compagnie Generale des Establissements Michelin, Michelin & CIE, Cleremont Ferrand, Cedex, France--.

Signed and Sealed this

Third Day of April, 2001

Attest:

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 5,989,712
DATED : November 23, 1999
INVENTOR(S) : Grimberg et al.

It is certified that error appears in the above-identified patent and that said Letters Patent is hereby corrected as shown below:

Title Page:
[73] Assignee: "Michelin Recherche Et Technique SA (Cours Sablon, FR)" should read -- Compagnie Generale des Establissements Michelin, Michelin & CIE, Cleremont Ferrand, Cedex, France --[73] Assignee:

In the Claims:
Column 17,
Line 32: "thriethoxysilane," should read -- triethoxysilane, --;

Column 18,
Line 40: "thriethoxysilane," should read --triethoxysilane, --;
Line 44: "-silyipropyl" should read -- -silylpropyl --.

In the Specification:
Column 4,
Line 34: "joule" should read -- Joule --;
Line 67: "onto the" should read -- onto the surface.--;

UNITED STATES PATENT AND TRADEMARK OFFICE
CERTIFICATE OF CORRECTION

PATENT NO. : 5,989,712
DATED : November 23, 1999
INVENTOR(S) : Grimberg et al.

It is certified that error appears in the above-identified patent and that said Letters Patent is hereby corrected as shown below:

Column 6,
Line 37: "α' martensite:" should read --¶α' martensite:--;
Line 38: " marten-" should read -- ¶ ε marten- --;

Column 12,
Line 55: "forc e" should read -- force --;

Signed and Sealed this

Tenth Day of July, 2001

Attest:

*Nicholas P. Godici*

NICHOLAS P. GODICI
*Attesting Officer*    *Acting Director of the United States Patent and Trademark Office*

UNITED STATES PATENT AND TRADEMARK OFFICE
CERTIFICATE OF CORRECTION

PATENT NO.    : 5,989,712
DATED         : November 23, 1999
INVENTOR(S)   : Grimberg et al.

It is certified that error appears in the above-identified patent and that said Letters Patent is hereby corrected as shown below:

Title page,
Item [73], "Michelin Recherche Et Technique SA (Cours Sablon, FR)" should read -- Compagnie Generale des Establissements Michelin, Michelin & CIE, Cleremont Ferrand, Cedex, France --.

Signed and Sealed this

Twenty-third Day of October, 2001

Attest:

NICHOLAS P. GODICI
Attesting Officer
Acting Director of the United States Patent and Trademark Office